US010655504B2

(12) United States Patent
Bergweiler

(10) Patent No.: US 10,655,504 B2
(45) Date of Patent: May 19, 2020

(54) HEAT PUMP FOR WARMING ENGINE COOLANT

(71) Applicant: DENSO International America, Inc., Southfield, MI (US)

(72) Inventor: Alec Bergweiler, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 163 days.

(21) Appl. No.: 15/477,436

(22) Filed: Apr. 3, 2017

(65) Prior Publication Data

US 2017/0342864 A1 Nov. 30, 2017

Related U.S. Application Data

(60) Provisional application No. 62/342,249, filed on May 27, 2016.

(51) Int. Cl.
| | |
|---|---|
| *F01K 23/06* | (2006.01) |
| *B60H 1/00* | (2006.01) |
| *F25B 41/04* | (2006.01) |
| *F25B 5/04* | (2006.01) |
| *F25B 6/04* | (2006.01) |
| *F01K 23/10* | (2006.01) |

(Continued)

(52) U.S. Cl.
CPC ....... *F01K 23/065* (2013.01); *B60H 1/00271* (2013.01); *B60H 1/00314* (2013.01); *B60H 1/00899* (2013.01); *F01K 23/10* (2013.01); *F02G 5/04* (2013.01); *F25B 5/04* (2013.01); *F25B 6/04* (2013.01); *F25B 41/04* (2013.01); *B60H 2001/00307* (2013.01); *B60H 2001/00928* (2013.01); *B60H 2001/00949* (2013.01); *F02G 5/00* (2013.01); *F02G 5/02* (2013.01); *F25B 27/02* (2013.01); *F25B 2400/0403* (2013.01); *F25B 2400/0409* (2013.01); *F25B 2400/0411* (2013.01); *F25B 2600/2501* (2013.01); *F25B 2600/2507* (2013.01); *Y02A 30/274* (2018.01); *Y02T 10/16* (2013.01); *Y02T 10/166* (2013.01)

(58) Field of Classification Search
CPC .......... F01K 23/065; F01K 23/10; F02G 5/04; F02G 5/02; F02G 5/00; F25B 5/04; F25B 6/04; F25B 41/04; F25B 27/02; F25B 2400/0403; F25B 2400/0409; F25B 2400/0411; F25B 2600/2501; F25B 2600/2507; B60H 1/00271; B60H 1/00314; B60H 1/00899; Y02A 30/274; F02N 19/02–10; F02B 29/0437–0443; F01P 3/22
USPC .......................................................... 60/320
See application file for complete search history.

(56) References Cited

U.S. PATENT DOCUMENTS

| | | | | |
|---|---|---|---|---|
| 6,321,552 B1 * | 11/2001 | Frederiksen | ............. | B60H 1/32 123/41.23 |
| 6,321,553 B1 * | 11/2001 | Bushnell | ................. | F24F 1/027 62/262 |

(Continued)

FOREIGN PATENT DOCUMENTS

| | | | |
|---|---|---|---|
| DE | 19727277 A1 | * | 1/1999 |
| JP | S5912874 A | * | 7/1984 |

*Primary Examiner* — Devon C Kramer
*Assistant Examiner* — Kelsey L Stanek

(57) ABSTRACT

A system for warming an engine. The system includes an engine coolant system that directs warm engine coolant to the engine to heat the engine. A heat pump system warms the engine coolant.

8 Claims, 5 Drawing Sheets

(51) Int. Cl.
    *F02G 5/04*     (2006.01)
    *F02G 5/00*     (2006.01)
    *F02G 5/02*     (2006.01)
    *F25B 27/02*     (2006.01)

(56) References Cited

U.S. PATENT DOCUMENTS

| | | |
|---|---|---|
| 9,180,754 B2 | 11/2015 | Wang et al. |
| 10,232,702 B2 * | 3/2019 | Nishikawa ............. B60K 11/02 |
| 2009/0211253 A1 * | 8/2009 | Radcliff ................ F01K 23/065 |
| | | 60/670 |
| 2013/0074497 A1 * | 3/2013 | Mori ....................... F01K 23/10 |
| | | 60/615 |
| 2014/0075966 A1 * | 3/2014 | Schmitz ............. B60H 1/00921 |
| | | 62/56 |
| 2016/0016456 A1 | 1/2016 | Kang et al. |
| 2016/0033193 A1 | 2/2016 | Kang et al. |
| 2016/0339767 A1 * | 11/2016 | Enomoto ........... B60H 1/00785 |
| 2017/0182866 A1 * | 6/2017 | Onishi ............... B60H 1/00778 |
| 2018/0134123 A1 * | 5/2018 | Herbolzheimer .. B60H 1/32284 |

* cited by examiner

HEAT PUMP FOR WARMING ENGINE COOLANT

CROSS-REFERENCE TO RELATED APPLICATION

This application claims the benefit of U.S. Patent Application No. 62/342,249 filed on May 27, 2016, the entire disclosure of which is incorporated herein by reference.

FIELD

The present disclosure relates to a heat pump, such as a waste heat recovery heat pump for example.

BACKGROUND

This section provides background information related to the present disclosure, which is not necessarily prior art. During cold engine starts, it is desirable to warm the engine as quickly as possible, such as by warming engine coolant, to optimize engine performance and efficiency. While systems for warming engine coolant are suitable for their intended use, they are subject to improvement. The present teachings advantageously include improved systems for warming engine coolant, particularly during a cold engine start. The systems according to the present teachings advantageously reduce engine warm-up time, which reduces vehicle emissions, improves fuel economy, and reduces cabin warm-up time, for example. The present teachings provide for numerous additional advantages and unexpected results, as described herein and as one skilled in the art will appreciate.

SUMMARY

This section provides a general summary of the disclosure, and is not a comprehensive disclosure of its full scope or all of its features.

The present teachings provide for a system for warming an engine. The system includes an engine coolant system that directs warm engine coolant to the engine to heat the engine. A heat pump system warms the engine coolant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
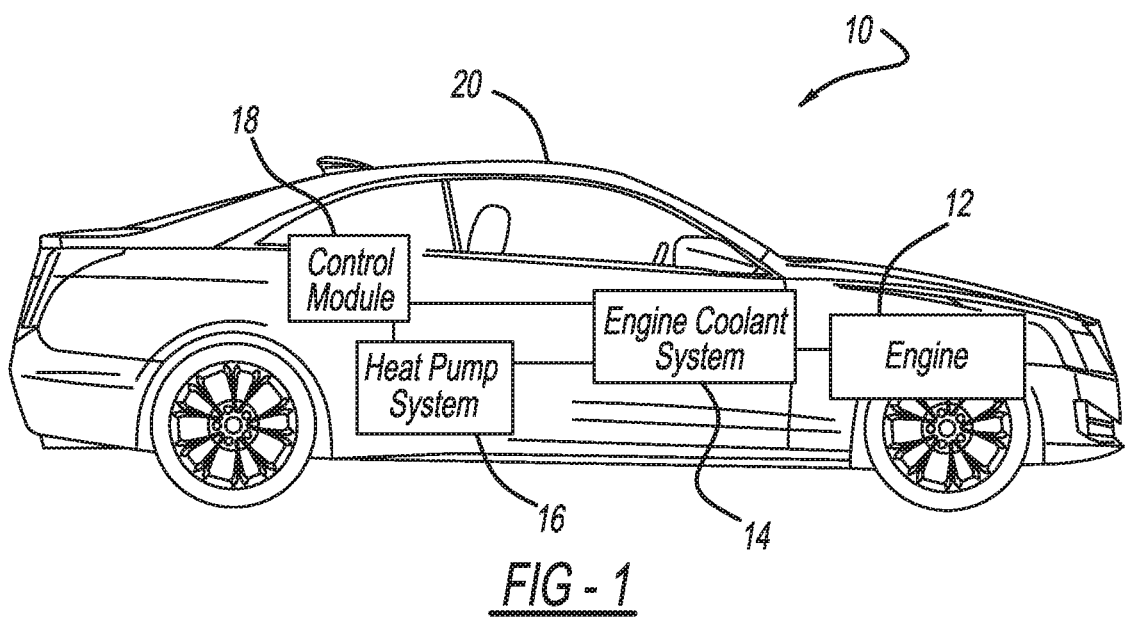
FIG. 1 illustrates a system according to the present teachings for warming an engine, the system is included with an exemplary vehicle.

FIG. 1 illustrates an exemplary system 10 in accordance with the present teachings for warming an engine 12. The engine 12 can be any suitable type of engine, such as an internal combustion engine, for example. The engine 12 is heated by an engine coolant system 14, which directs warm engine coolant through the engine 12 in order to heat the engine 12. The engine coolant is heated by a heat pump system 16. The system 10 is controlled by a control module 18.

Although FIG. 1 illustrates the system 10 as included with a passenger vehicle 20, the system 10 can be included with any suitable vehicle in order to heat any suitable engine thereof. For example, the system 10 can be included with any suitable mass transit vehicle, military vehicle, recreational vehicle, commercial vehicle, construction equipment, watercraft, aircraft, etc. The system 10 can also be used to warm any suitable non-vehicular engine, such as engines included with generator systems, military systems, etc.

In this application, including the definitions below, the term "module," such as with respect to control module 18, may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 2:
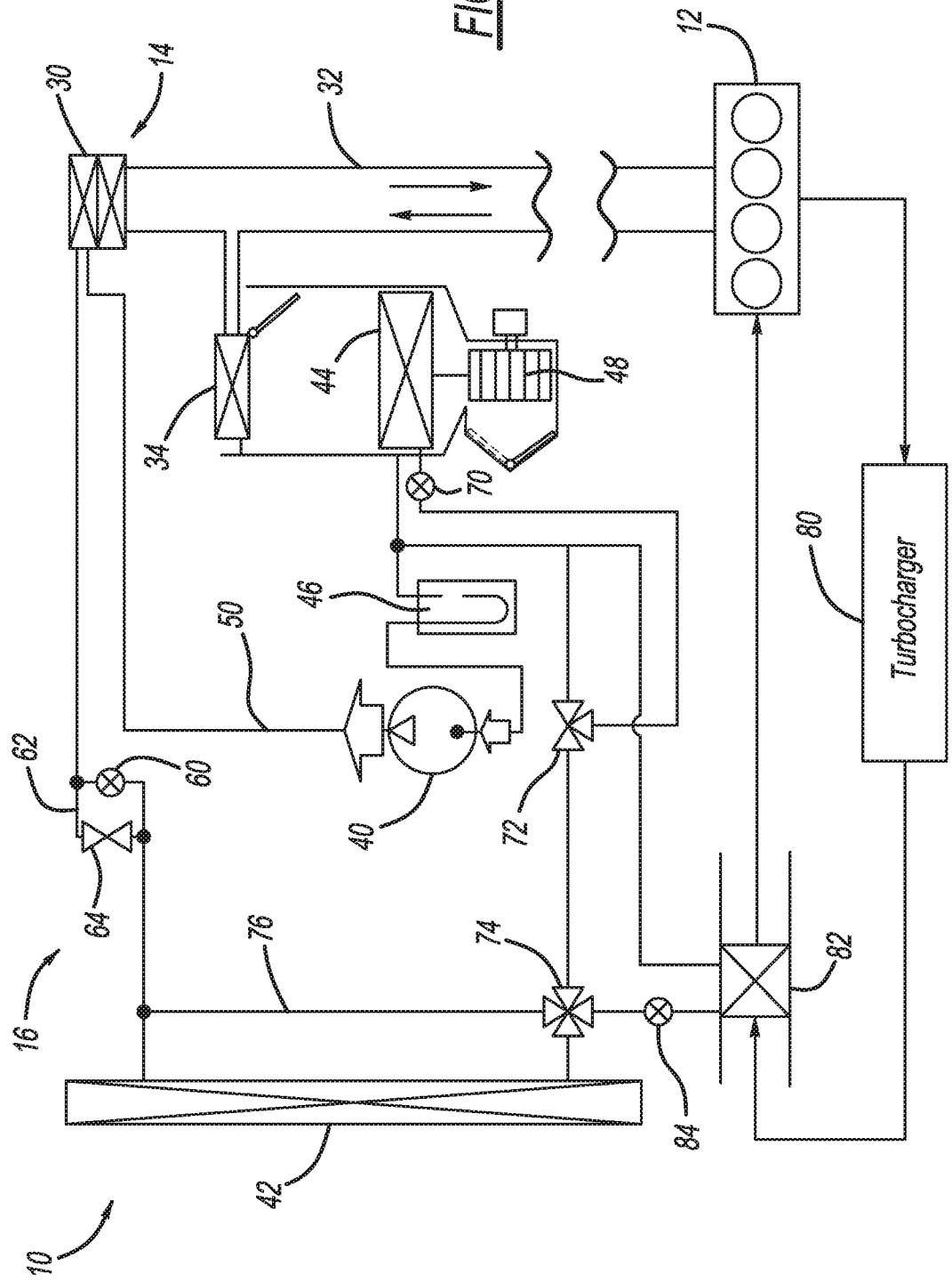
FIG. 2 illustrates the system of FIG. 1 including a charge air to refrigerant heat exchanger in accordance with the present teachings configured to transfer heat from charge air to refrigerant of a heat pump system, the heat pump system heats coolant circulated through the engine to warm the engine.

With reference to FIG. 2, the system 10 will now be described in additional detail. The engine coolant system 14 generally includes a condenser 30 and a coolant line 32. The condenser 30 can be any suitable condenser, such as a water-cooled condenser. The coolant line 32 can be any suitable conduit for any suitable coolant, such as a water-based coolant. The coolant line 32 provides a primary coolant loop, which conducts coolant from the condenser 30 to the engine 12, from the engine 12 to a heater core 34, and from the heater core 34 back to the condenser 30.

The coolant line 32 circulates coolant across the engine 12. During a cold engine start, circulating warmed coolant across the engine 12 advantageously reduces engine warmup time, which advantageously reduces emissions, increases fuel economy, and reduces cabin warmup time. Once the engine 12 has reached a suitable operating temperature, circulation of coolant through the engine 12 will prevent the engine 12 from becoming too warm.

The heat pump system 16 will now be described. The heat pump system 16 generally includes a compressor 40, an outside heat exchanger 42, an evaporator 44, and an accumulator 46. A blower 48 may be included to blow airflow across the evaporator 44 in order to cool a passenger cabin in accordance with some applications of the present teachings, as described further herein.

The compressor 40 compresses refrigerant into a high pressure gas, and directs the refrigerant from the compressor 40 to the condenser 30 through refrigerant lines 50. The heat pump system 16 includes a plurality of refrigerant lines 50 suitable for conducting refrigerant through the heat pump system 16. From the condenser 30, the refrigerant flows through either a first expansion device 60 or a bypass line 62 including a valve 64. The first expansion device 60 can be any suitable refrigerant expansion device, such as a thermal expansion valve (TXV), an electronic expansion valve (EXV), or any suitable orifice tube. From the first expansion device 60 and the valve 64, the refrigerant flows through the outside heat exchanger 42, or bypass line 76, which directs refrigerant around the outside heat exchanger 42. As explained further herein, the outside heat exchanger 42 can be configured as an evaporator to absorb heat from outside air, or a condenser during various cooling modes as explained further herein.

From the outside heat exchanger 42, as well as the bypass line 76, refrigerant can flow directly back to the accumulator 46, or to the evaporator 44 through the second expansion device 70, which can be any suitable TXV, EXV, or orifice tube. A three-way valve 72, or any other suitable valve or device, can be used to selectively direct refrigerant to the evaporator 44 or directly to the accumulator 46 without passing through the evaporator 44. From the evaporator 44, the refrigerant flows to the accumulator 46, and from the accumulator 46 the refrigerant returns to the compressor 40.

Figure 5:
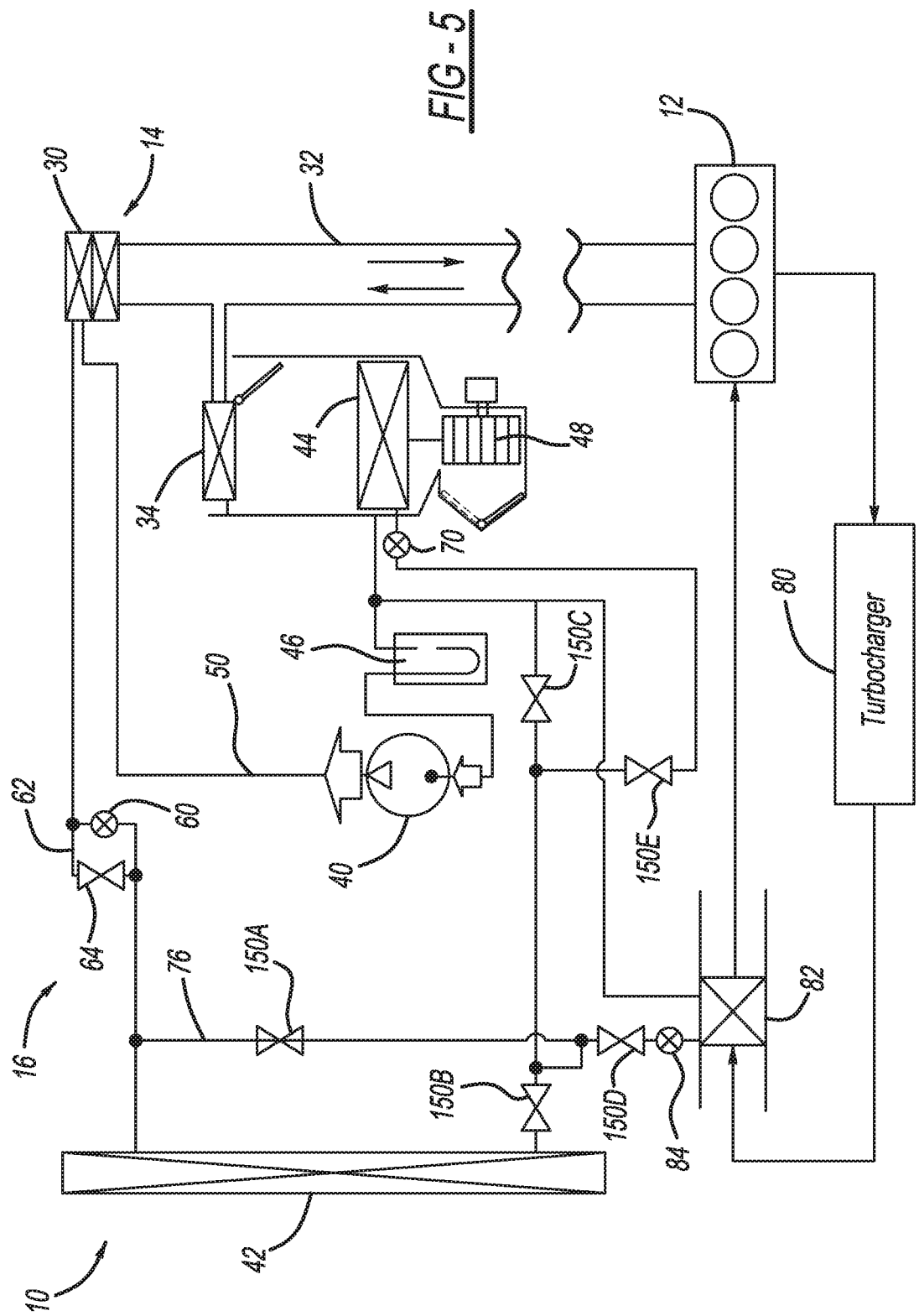
FIG. 5 illustrates the system of FIG. 1 with an alternative valve arrangement in accordance with the present teachings.

In some applications an additional valve, such as four-way valve 74, is arranged between the outside heat exchanger 42 and the three-way valve 72. With reference to FIG. 5, the system 10 can include an alternative valving arrangement. Specifically, the multiway valves 72 and 74 can be replaced by a plurality of two way valves 150A, 150B, 150C, 150D, and 150E. The control module 18 can be configured to operate each one of the valves 64, 72, 74, 150A, 150B, 150C, 150D, and 150E, as well as the first and second expansion devices 60 and 70 (and third expansion device 84 described further herein), in order to selectively direct refrigerant through the heat pump system 10 to provide the various modes of operation described herein.

Heating Mode with Ambient Air Extraction (without Waste Heat):

The heat pump system 16 warms coolant in the coolant line 32 of the engine coolant system 14 in order to warm the engine and bring the engine to its normal operating temperature more quickly than if coolant of the coolant line 32 was not warmed by the heat pump system 16. Heating the coolant of the coolant line 32 with the heat pump system 16, particularly during a cold start of the engine 12, reduces engine warmup time, and thus reduces undesirable engine emissions, improves fuel economy, and decreases cabin warmup time. Specifically, the system 10 is configured such that the compressor 40 compresses refrigerant in refrigerant line 50 to provide the refrigerant as a high pressure gas. The high pressure gas enters the condenser 30, which extracts heat from the refrigerant and transfers heat to the coolant of the coolant line 32 to warm the coolant. The warmed coolant is conducted by the coolant line 32 to the engine 12 in order to heat the engine 12. The coolant can then be directed to the heater core 34 in order to heat the passenger cabin. From the heater core 34, the coolant returns to the condenser 30.

Refrigerant flows from the condenser 30 as a high pressure liquid. The high pressure liquid refrigerant is directed through the first expansion device 60 and to the outside heat exchanger 42, which acts as an evaporator to absorb heat from the outside air. From the outside heat exchanger 42 the refrigerant flows to the three-way valve 72, which is configured to direct the refrigerant directly to the accumulator 46. From the accumulator 46 the refrigerant flows to the compressor 40, and again to the condenser 30 to heat the coolant of the engine coolant system 14. This heating mode with ambient air is particularly effective when the external temperature is sufficiently warm. During cooler temperatures, a source of waste heat can be added to the heat pump system 16 to warm the refrigerant, as explained herein. This heating mode with ambient air can be performed by the heat pump system 16 regardless of whether the heat pump system 16 is in cooperation with any of the waste heat recovery systems of FIGS. 2, 3, and 4 described herein.

Figure 3:
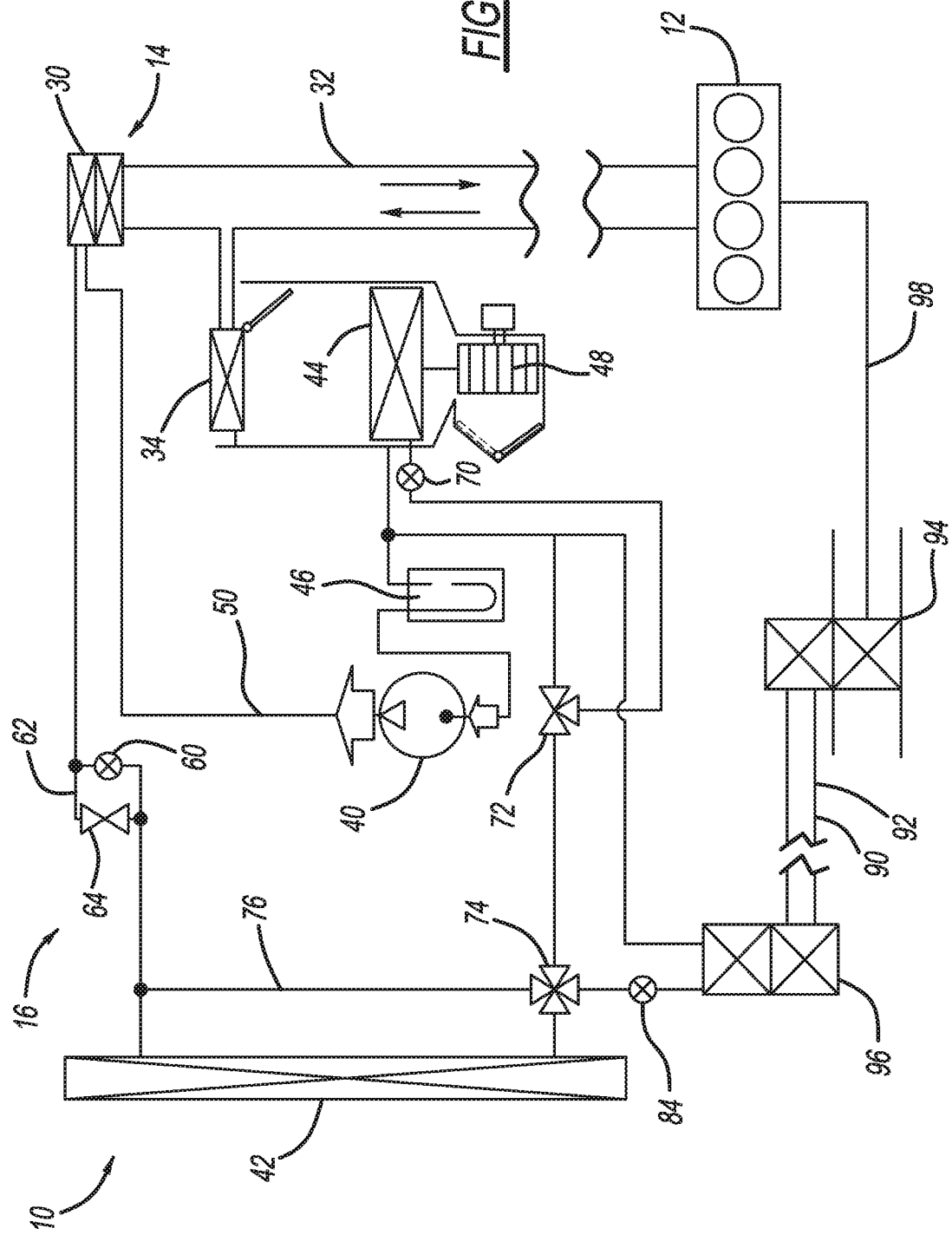
FIG. 3 illustrates the system of FIG. 1 including a coolant loop warmed by exhaust from the engine, a coolant to refrigerant heat exchanger transfers heat from the coolant to the heat pump system.
Figure 4:
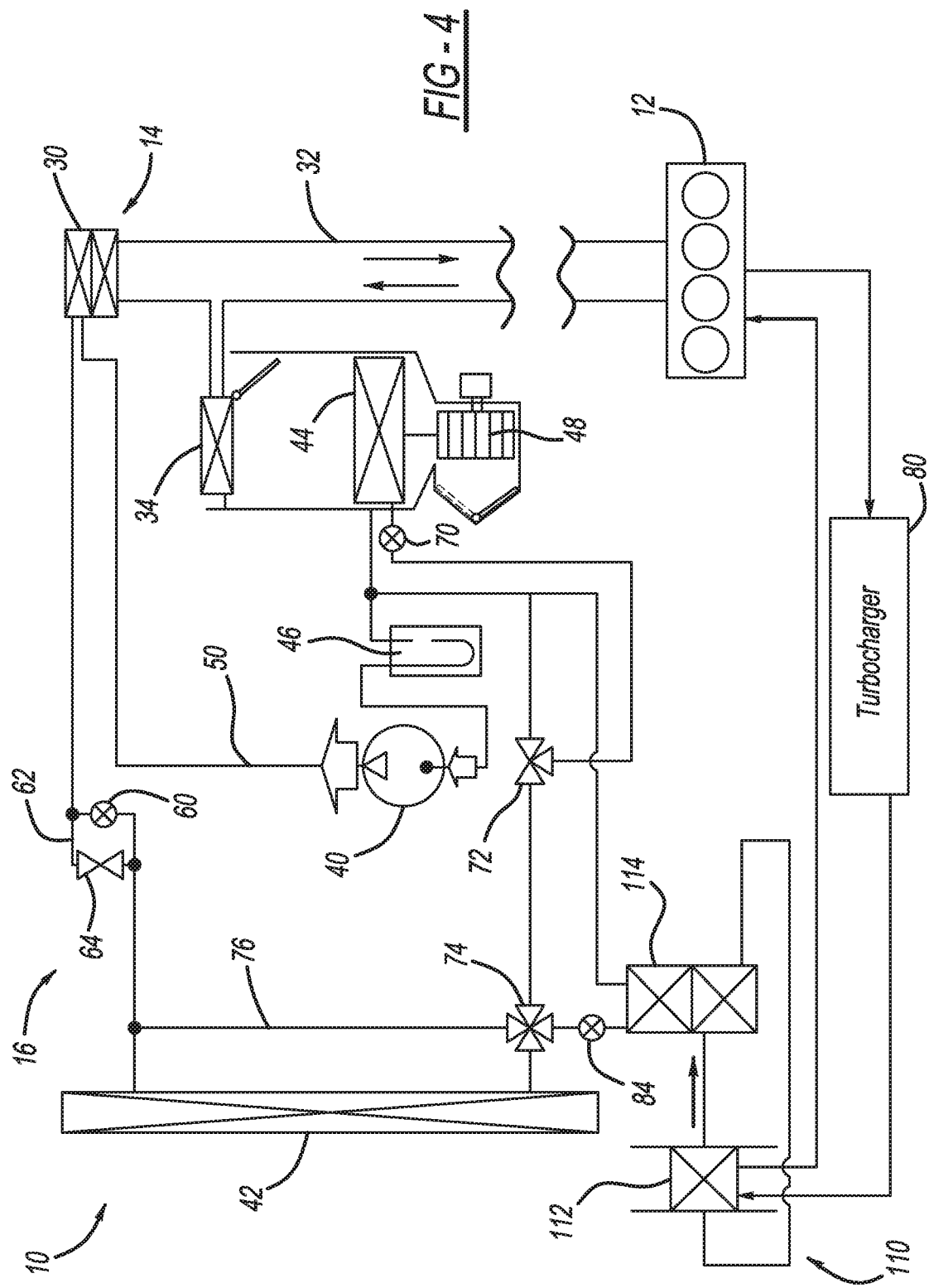
FIG. 4 illustrates the system of FIG. 1 including an additional coolant loop that is warmed by charge air from a turbocharger, a heat exchanger transfers heat from the additional coolant loop to the heat pump system.

Cabin Cooling Only Mode (without Waste Heat):

The heat pump system 16 can be operated in a cabin cooling only mode. In the cabin cooling only mode, the passenger cabin of the vehicle 20 is cooled (or any other suitable room or space is cooled when the system 10 is used in a different application other than that illustrated in FIG. 1). Specifically, the compressor 40 compresses the refrigerant to provide the refrigerant as a high pressure gas, which flows through the condenser 30 and advantageously warms the engine 12. The first expansion device 60 is not open so the refrigerant flows through the valve 64 to the outside heat exchanger 42 as a high pressure gas. The outside heat exchanger 42 is operated as a condenser, which convects heat to convert the high pressure gas to high pressure liquid refrigerant. From the outside heat exchanger 42 the refrigerant is directed to the second expansion device 70, which converts the refrigerant to a low pressure liquid. At the evaporator 44, heat is absorbed to cool the passenger cabin or other space. The refrigerant flows from the evaporator 44 as a low pressure gas, and returns to the compressor 40. This cabin cooling only mode can be provided regardless of whether any of the waste heat recovery systems of FIGS. 2, 3, and 4 are coupled to the heat pump system 16 as described herein. In this cabin cooling only mode, the refrigerant flows from the outside heat exchanger 42 without being heated by the waste heat recovery systems of FIGS. 2, 3, and 4.

Waste Heat Recovery from Charge Air:

With reference to FIG. 2, when a turbocharger 80 is coupled to the engine 12 to receive exhaust gas from the engine 12, the present teachings further provide for a charge air-refrigerant heat exchanger (HEX) 82. The charge air-refrigerant HEX 82 transfers heat from charge air exiting the turbocharger 80 to the heat pump system 16 to advantageously warm the refrigerant of the heat pump system 16. The charge air-refrigerant HEX 82 also advantageously cools the charge air prior to the charge air flowing to the engine 12. A third expansion device 84, such as a thermal expansion valve (TXV), an electronic expansion valve (EXV), or any suitable orifice tube, is arranged along the refrigerant line 50 just prior to the charge air-refrigerant heat exchanger 82 as illustrated.

Waste Heat Recovery from Exhaust Gas:

With additional reference to FIG. 3, in some applications the system 10 can include a secondary coolant loop 90 including a coolant conduit 92 configured to circulate coolant between an exhaust gas-coolant heat exchanger 94 and a coolant-refrigerant heat exchanger 96. The exhaust gas-coolant heat exchanger 94 is coupled to an exhaust gas conduit 98, which directs exhaust gas to the exhaust gas-coolant heat exchanger 94. At the exhaust gas-coolant heat exchanger 94, heat of the exhaust gas is transferred to coolant of the coolant conduit 92. At the coolant-refrigerant heat exchanger 96, heat from the coolant is transferred to the refrigerant of the heat pump system 16. The coolant-refrigerant heat exchanger 96 is arranged in the same position as the charge air-refrigerant heat exchanger 82. Thus refrigerant flowing through the coolant-refrigerant heat exchanger 96 is heated by the exhaust from the engine 12. The secondary coolant loop 90 is optional. Thus, in some applications the exhaust conduit 98 can be connected directly to heat exchanger 96, which will be an exhaust gas-refrigerant heat exchanger.

Waste Heat Recovery from Low Temperature Secondary Coolant Loop:

With reference to FIG. 4, the system 10 can include a secondary coolant loop 110, which can include a water-charge air heat exchanger 112, a transmission oil heat exchanger, a fuel heat exchanger, and a secondary radiator. A water-refrigerant heat exchanger 114 may also be included. The secondary coolant loop 110 can include any suitable coolant, such as water. At the water-charge air heat exchanger 112, coolant of the coolant loop 110 is heated by charge air from the turbocharger 80, and the charge air is advantageously cooled prior to reaching the engine 12. From the water-charge air heat exchanger 112, the heated coolant flows to water-refrigerant heat exchanger 114. At the water-refrigerant heat exchanger 114 refrigerant of the heat pump system 16 is warmed by the coolant of the secondary coolant loop 110. The water-refrigerant heat exchanger 114 is arranged in the same position as the charge air-refrigerant heat exchanger 82.

Heating Mode with Waste Heat Recovery (No Ambient Air):

In a heating mode using waste heat recovery, the system 10 is configured such that refrigerant exiting the condenser 30 flows through the bypass lines 62 and the two-way valve 64 thereof, through the bypass line 76, through four-way valve 74, and through third expansion device 84. From the third expansion device 84, the refrigerant is heated by the waste heat recovered by either the charge air-refrigerant HEX 82 (FIG. 2), the coolant-refrigerant HEX 96 (FIG. 3), or the coolant-refrigerant HEX 114 (FIG. 4). The refrigerant then flows to the accumulator 46 and the compressor 40, where the temperature of the refrigerant is further increased. The warmed/hot refrigerant then flows to the condenser 30 where the refrigerant effectively heats the coolant of the engine coolant system 14, and ultimately the engine 12. This mode is particularly useful when the ambient air is cold because no ambient air is used.

Heating Mode with Waste Heat Extraction (and Ambient Air):

When the system 10 is operating in a relatively warmer environment, instead of the refrigerant being directed through the bypass line 76, the refrigerant of the heat pump system 16 is directed through the first expansion device 60 and through the heat exchanger 42, which is configured as an evaporator to transfer heat from the outside environment to the refrigerant in order to further heat the refrigerant. At the four-way valve 74, the refrigerant can be directed through the third expansion device 84. From the third expansion device 84, the refrigerant is further heated by the waste heat recovered by either the charge air-refrigerant HEX 82 (FIG. 2), the coolant-refrigerant HEX 96 (FIG. 3), or the coolant-refrigerant HEX 114 (FIG. 4). The refrigerant is then directed to the accumulator 46, the compressor 40, and the condenser 30 in order to heat the coolant of the engine coolant system 14.

Cooling Mode (Charge Air Cooling Only):

Cool refrigerant circulating through the heat pump system 16 can be used to cool the charge air so that the charge air is not too warm when it enters the engine 12. In this mode, the compressor 40 compresses the refrigerant to provide the refrigerant as a high temperature, high pressure gas, which flows to the condenser 30 to warm coolant of the engine coolant system 14 at engine start. After the engine 12 warms up, the temperature of the coolant and refrigerant becomes generally the same. The first expansion device 60 is not open so the refrigerant flows through the valve 64 to the outside heat exchanger 42 as a high temperature, high pressure gas. The outside heat exchanger 42 is operated as a condenser, which convects heat to convert the high pressure gas to high pressure liquid. From the outside heat exchanger 42, the refrigerant flows through the third expansion device 84 to the charge air-refrigerant HEX 82 where the refrigerant cools the charge air from the turbocharger 80 prior to the charge air flowing to the engine 12. From the charge air-refrigerant HEX 82 the refrigerant flows directly to the accumulator 46 and then to the compressor 40.

Cooling Mode (Combined Cabin and Charge Air Cooling):

Cool refrigerant circulating through the heat pump system 16 can be used to cool both the passenger cabin (of vehicle 20 or any other suitable area or room), and the charge air so that the charge air does not enter the engine at too high a temperature. In this mode, refrigerant exiting the outside heat exchanger 42, which is operated as a condenser, is directed to both the charge air-refrigerant HEX 82 and to the evaporator 44. Specifically, at four-way valve 74 a portion of the refrigerant flows to the third expansion device 84, and a portion of the refrigerant flows to the three-way valve 72. From the three-way valve 72 the refrigerant flows to the second expansion device 70 and then to the evaporator 44 to cool the passenger cabin or other space. Refrigerant flows from the charge air-refrigerant HEX 82 directly back to the accumulator 46, and refrigerant flows from the evaporator to the accumulator 46. From the accumulator 46 the refrigerant flows to the compressor 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for warming an engine, the system comprising:
    an engine coolant system that directs engine coolant to the engine to warm the engine, the engine coolant system including a condenser and a heater core in fluid communication with the engine by way of a primary coolant loop such that engine coolant flowing from the engine flows through the heater core to the condenser and back to the engine;
    a heat pump system that warms the engine coolant, the heat pump system including:
        a compressor in fluid communication with the condenser, the compressor compresses refrigerant into high pressure gas that flows from the compressor to the condenser;
        an outside heat exchanger in receipt of refrigerant flowing from the condenser;
        a thermal expansion device between the condenser and the outside heat exchanger; and
        an evaporator in receipt of refrigerant from the outside heat exchanger, refrigerant flows through the evaporator and back to the compressor;
    a secondary coolant loop includes secondary coolant that is heated by charge air generated by a turbocharger, the secondary coolant loop is independent of the heater core; and
    a heat exchanger transfers heat from the heated secondary coolant to the heat pump system.

2. The system of claim 1, wherein the heat pump system is configured to direct refrigerant warmed by the charge air to the condenser in receipt of the engine coolant to heat the engine coolant.

3. The system of claim 1, wherein the heat pump system is configured to direct refrigerant through the outside heat exchanger, and from the outside heat exchanger to the heat exchanger configured to transfer heat to the heat pump system from charge air generated by the turbocharger.

4. A system for warming an engine, the system comprising:
    an engine coolant system that directs engine coolant to the engine to warm the engine, the engine coolant system including a condenser and a heater core in fluid communication with the engine by way of a primary coolant loop such that engine coolant flowing from the engine flows through the heater core to the condenser and back to the engine;
    a heat pump system that warms the engine coolant, the heat pump system including:
        a compressor in fluid communication with the condenser, the compressor compresses refrigerant into high pressure gas that flows from the compressor to the condenser;
        an outside heat exchanger in receipt of refrigerant flowing from the condenser;
        a thermal expansion device between the condenser and the outside heat exchanger; and
        an evaporator in receipt of refrigerant from the outside heat exchanger, refrigerant flows through the evaporator and back to the compressor; and
    a waste heat recovery system that warms refrigerant of the heat pump system, the refrigerant warms the coolant;
    wherein the waste heat recovery system includes a secondary coolant loop with coolant that is warmed by charge air from a turbocharger, heat from the secondary coolant loop is transferred to the refrigerant to warm the refrigerant, the secondary coolant loop is independent of the heater core.

5. The system of claim 4, further comprising a heat exchanger that transfers heat from charge air to the refrigerant.

6. The system of claim 4, wherein the waste heat recovery system warms the refrigerant with exhaust from the engine.

7. The system of claim 4, further comprising a refrigerant-charge air heat exchanger configured to extract heat from charge air of the turbocharger to cool the charge air prior to the charge air entering the engine.

8. The system of claim 7, wherein the heat pump system is configured to direct refrigerant from the outside heat exchanger to the evaporator to cool a vehicle passenger cabin.

\* \* \* \* \*